United States Patent
Vivanco et al.

(10) Patent No.: US 8,644,154 B2
(45) Date of Patent: Feb. 4, 2014

(54) PREDICTIVE THROUGHPUT MANAGEMENT

(75) Inventors: Daniel A. Vivanco, Herndon, VA (US); Esmail Hejazi Dinan, Herndon, VA (US); Hemanth Balaji Pawar, Herndon, VA (US); Howard Bishop Anderson, Ashburn, VA (US); Vijay Rudraraju, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 464 days.

(21) Appl. No.: 12/389,475

(22) Filed: Feb. 20, 2009

(65) Prior Publication Data

US 2010/0214923 A1 Aug. 26, 2010

(51) Int. Cl.
*H04J 1/16* (2006.01)

(52) U.S. Cl.
USPC ........... 370/235; 370/254; 370/328; 709/232; 455/456.6; 342/357.4; 375/267

(58) Field of Classification Search
USPC ......... 370/235, 252–253, 333, 329, 338, 310, 370/328, 480, 436; 455/456.1, 456.5, 455/456.6, 161.3, 343.1, 550.1; 375/346; 709/203, 209, 232; 342/357.4
See application file for complete search history.

(56) References Cited

U.S. PATENT DOCUMENTS

| | | | |
|---|---|---|---|
| 6,750,813 B2 * | 6/2004 | Vargas-Hurlston et al. | 342/357.4 |
| 7,054,286 B2 | 5/2006 | Ertel et al. | |
| 7,072,670 B2 * | 7/2006 | Sato et al. | 455/456.1 |
| 7,130,937 B2 * | 10/2006 | Hwang et al. | 710/57 |
| 7,978,724 B1 * | 7/2011 | Mansour et al. | 370/436 |
| 8,411,637 B2 * | 4/2013 | Wu et al. | 370/330 |
| 2002/0051462 A1 | 5/2002 | Ertel et al. | |
| 2003/0065712 A1 * | 4/2003 | Cheung et al. | 709/203 |
| 2004/0176111 A1 * | 9/2004 | Wilhelm | 455/456.6 |
| 2006/0019679 A1 * | 1/2006 | Rappaport et al. | 455/456.5 |
| 2007/0115899 A1 * | 5/2007 | Ovadia et al. | 370/338 |
| 2008/0002659 A1 | 1/2008 | Fontaine et al. | |
| 2008/0037464 A1 * | 2/2008 | Lim et al. | 370/329 |
| 2008/0037556 A1 | 2/2008 | Denney et al. | |
| 2008/0151976 A1 | 6/2008 | Stoye | |
| 2008/0254760 A1 * | 10/2008 | Wu et al. | 455/343.1 |
| 2008/0259834 A1 * | 10/2008 | Joung et al. | 370/310 |
| 2009/0005109 A1 * | 1/2009 | Nishio et al. | 455/550.1 |
| 2009/0022254 A1 * | 1/2009 | Na et al. | 375/346 |
| 2009/0067369 A1 * | 3/2009 | Stamoulis et al. | 370/328 |
| 2009/0097583 A1 * | 4/2009 | Shin et al. | 375/267 |
| 2009/0119009 A1 * | 5/2009 | Dicke | 701/209 |
| 2009/0154353 A1 * | 6/2009 | Loiacono et al. | 370/235 |
| 2009/0175191 A1 * | 7/2009 | Lin et al. | 370/253 |
| 2009/0180396 A1 * | 7/2009 | Kish | 370/254 |
| 2009/0185502 A1 * | 7/2009 | Sung et al. | 370/252 |
| 2009/0253392 A1 * | 10/2009 | Colonna | 455/161.3 |
| 2010/0054143 A1 * | 3/2010 | Kokku et al. | 370/252 |
| 2010/0121977 A1 * | 5/2010 | Kontola et al. | 709/232 |
| 2010/0240396 A1 * | 9/2010 | Zhang et al. | 455/456.1 |
| 2011/0044356 A1 * | 2/2011 | Hadad et al. | 370/480 |

* cited by examiner

*Primary Examiner* — Michael Thier
*Assistant Examiner* — Vincelas Louis (57) ABSTRACT

A wireless device is communicated with using a first throughput. A predicted location for the wireless device is determined. Based on the predicted location, a predicted maximum throughput at the predicted location is determined. Based on the predicted maximum throughput, a second throughput is determined. The wireless device is communicated with using the second throughput.

17 Claims, 5 Drawing Sheets

PREDICTIVE THROUGHPUT MANAGEMENT

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A wireless device is communicated with using a first throughput. A predicted location for the wireless device is determined. Based on the predicted location, a predicted throughput at the predicted location is determined. Based on the predicted throughput, a second throughput is determined. The wireless device is communicated with using the second throughput.

A predicted location of a wireless device is determined. Based on the predicted location, a predicted throughput from a content server to the wireless device is determined. It is determined that the predicted throughput satisfies a criteria. Based on the predicted throughput satisfying the criteria, a throughput for the content server to send data to the wireless device is determined.

A first location at a first time is determined for a wireless device. A second location at a second time is determined for the wireless device. Based on the first location, the second location, the first time, and the second time, a predicted location at a third time is determined for the wireless device. Based on the predicted location and the third time, a predicted throughput is determined. Based on the predicted throughput, an indicator of desired throughput is sent to a content server.

DETAILED DESCRIPTION

In an embodiment, the location of a wireless device is determined at several points in time. These locations are used to determine a predicted location of the wireless device at a future time. The predicted location is used to predict a maximum throughput (i.e., bitrate) between a content server and the wireless device at the future time. The predicted maximum throughput is used to adjust the current throughput. The current throughput is adjusted such that the user does not experience service interruptions when, at the future time, the maximum throughput drops below a minimum required throughput.

Figure 1:
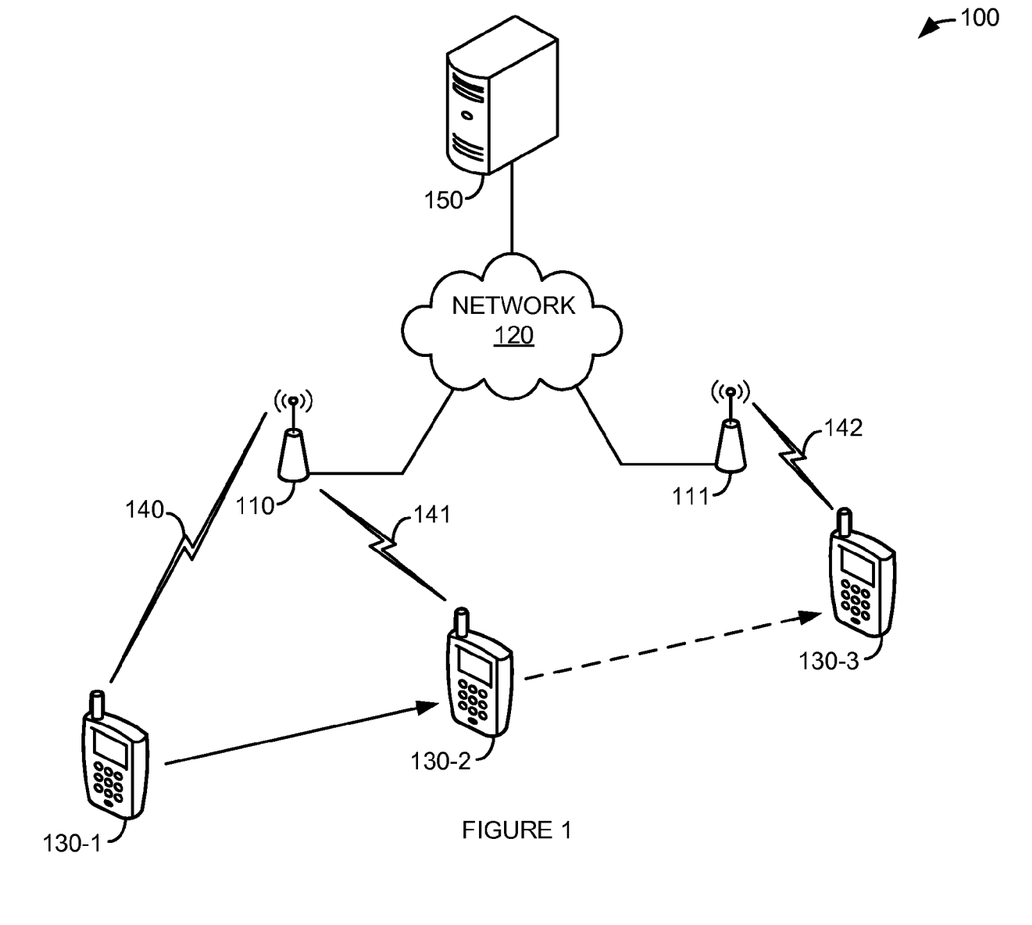
FIG. 1 is a block diagram illustrating a communication system.

FIG. 1 is a block diagram illustrating a communication system. In FIG. 1, communication system 100 comprises: base station 110, base station 111, network 120, wireless device 130, and content server 150. Wireless device 130 is shown at a first location, denoted 130-1, a second location, denoted 130-2, and a predicted location, denoted 130-3. Wireless device 130 at the first location (130-1) is operatively coupled to base station 110 via wireless link 140. Wireless device 130 at the second location (130-2) is operatively coupled to base station 110 via wireless link 141. Wireless device 130 at the predicted location (130-3) will be operatively coupled to base station 111 via wireless link 142.

Base station 110 is operatively coupled to network 120. Base station 111 is operatively coupled to network 120. Content server 150 is operatively coupled to network 120. Thus, wireless device 130 may receive content from content server 150 at the first location (130-1) and the second location (130-2) via network 120 and base station 110. Wireless device 130 may receive content from content server 150 at the predicted location (130-3) via network 120 and base station 111.

Wireless device 130 may be any device, system, combination of devices, or other such communication platform capable of communicating with base station 110 via wireless links 140-141. Wireless device 130 may use communication aspects specified by the WiMAX specification including, but not limited to, the channel bandwidths detailed therein. Wireless device 130 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base stations 110 and 111 via wireless links. Other types of communication platforms are possible.

Base station 110 and base station 111 may be any wireless system that provides the air interface to wireless device 130. Base station 110 and base station 111 may also use one or more transmitters. Base station 110 base station 111 may also use one or more receivers. Base station 110 and base station 111 may be any wireless system that can provide an air interface to wireless device 130. Base station 110 and base station 111 may use communication aspects specified by the WiMAX specification including, but not limited to, the service flow classifications and modulation and coding schemes detailed therein. Examples of base stations that may be utilized include, base transceiver stations (BTSs), radio base stations (RBSs), Node B, enhanced Node B (eNBs) and others. Base stations may include a number of elements known to those skilled in the art comprising transceivers, power amplifiers, combiner, duplexer, and antennas. Base station 110 and base station 111 may also include other additional components such as a control function or control computer. However, these components have been omitted from FIG. 1 for the sake of brevity.

Network 120 may be any network or collection of networks that couple, link, or otherwise operatively connect base station 110 and base station 111 with other devices or systems. Network 120 may include other secondary data networks. In an example, network 120 may include a backhaul network, a local network, a long distance network, a packet network, the internet, or any combination thereof, as well as other types of networks.

In an example, network 120 may be, or include all or parts of an IEEE 802.16 (WiMAX) specified system. These parts may include additional base stations (BSs), an access services network (ASN), access services network gateway (ASN-GW), or connectivity service network (CSN).

In an embodiment, wireless device 130 may request communication services from content server 150. These services may be associated with voice services and/or data services. These voice and data services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

In an embodiment, communication system 100 may determine a first estimated location (130-1) for wireless device 130 at a first time. Communication system 100 may determine a second estimated location (130-2) for wireless device 130 at a second time. These location-time samples may be collected at regular intervals. Based on at least the first and second estimated locations (130-1 and 130-2), and the first and second times, communication system 100 may determine a predicted location (130-3) for wireless device 130 at a third (future) time.

There are a variety of methods that may be used to estimate the first and second locations (130-1 and 130-2) of wireless device 130. These methods may be used alone or in combination with each other or other methods. These methods may be based on round-trip delay time, triangulation, or signals received by wireless device 130 from a global positioning system (GPS). In the case of a GPS system, wireless device 130 may communicate its estimated position to base station 110 based on the signals it received from the GPS system.

To determine a predicted location (130-3) for wireless device 130, communication system 100 may use one or more prediction techniques. For example, communication system 100 may use extrapolation. In this case, the change in location from the first location (130-1) to the second location (130-2), and the change in time from the first time to the second time, may be used to extrapolate a predicted location (130-3) at the third time. In another example, fuzzy logic may be applied using the first and second estimated locations (130-1 and 130-2), and the first and second times to determine a predicted location (130-3) at the third time. In another example, a neural network may be used to determine a predicted location (130-3) at the third time. For all of these methods, additional location-time samples may also be used to help determine a predicted location (130-3) at the third time. Communication system 100 may also determine a confidence interval that indicates an estimated accuracy for the predicted location (130-3) and/or the third time.

Based on the predicted location (130-3) at the third time, communication system 100 predicts the carrier to interference and noise ratio (CINR) and the modulation and coding scheme (MCS), that wireless device 130 will be using at the predicted location (130-3) at the third time. Communication system 100 may predict a base station (e.g., base station 111) that wireless device 130 will utilize at the predicted location (130-3). 3).Communication system 100 may predict other network elements (e.g., ASN-GW, backhaul link, etc.) that will operatively couple wireless device 130 to content server 150 at the third time. CINR, MCS, and the predicted base station 111 may be determined from previous location-time samples collected from wireless device 130, or other wireless devices (not shown) that have communicated with communication system 100 from near the predicted location (130-3).

Based on one or more of the CINR, MCS, air-interface utilization of the predicted base station 111, base station throughput of the predicted base station 111, predicted backhaul throughput, and network 120 throughput from the predicted base station 111, communication system 100 may determine a predicted throughput. This predicted throughput may be a prediction of the maximum, minimum, average, or sustained throughput of the link between wireless device 130 and content server 150. Based on the predicted throughput, communication system 100 may determine a throughput for content server 150 to use. For example, if the predicted throughput indicates that, at the predicted location (130-3), the link between wireless device 130 and content server 150 cannot handle a minimum throughput required, communication system 100 may instruct content server 150 to reduce the rate it is sending content. By reducing the rate content server 150 is sending content, the resources of network 120, base station 111, or the air-interface are not wasted.

In another example, if the current throughput or predicted throughput indicates that the link between wireless device 130 and content server 150 can handle more than a maximum throughput, communication system 100 may instruct content server 150 to increase the rate it is sending content. When content server 150 is sending content above the maximum rate, wireless device 130 may buffer the excess content it is receiving. This excess content may then be used by wireless device 130 when content server 150 is sending at less than the minimum required rate. Thus, by adjusting the rate content server 150 is sending content higher the user does not experience service interruptions when the throughput drops below the minimum required throughput at the future time.

Figure 2:
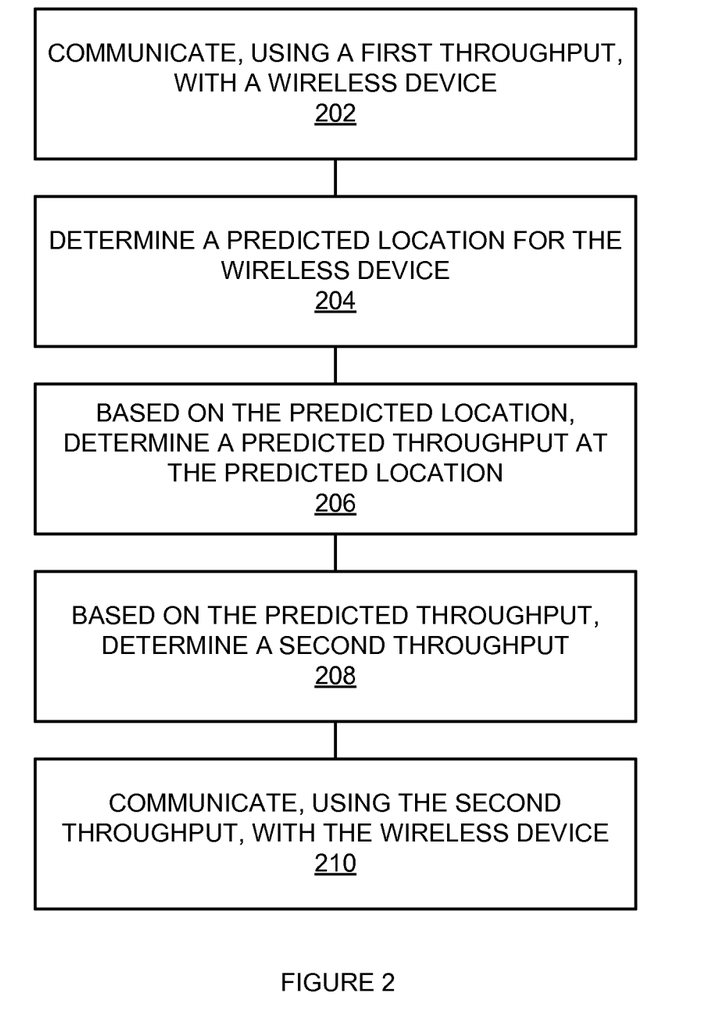
FIG. 2 is a flowchart illustrating a method of operating a communication system.

FIG. 2 is a flowchart illustrating a method of operating a communication system. The steps illustrated in FIG. 2 may be performed by one or more elements of communication system 100.

Using a first throughput, a wireless device is communicated with (202). For example, content server 150 may send content to wireless device 130 at a first throughput. A predicted location for the wireless device is determined (204). For example, communication system 100 may determine a predicted location (130-3) for wireless device 130. The predicted location may be determined in a manner described previously.

Based on the predicted location, a predicted throughput at the predicted location is determined (206). For example, communication system 100 may determine a predicted throughput based on the predicted location (130-3). Communication system 100 may determine a predicted throughput based on the predicted CINR and/or MCS that wireless device 130 will be using at the predicted location (130-3). Communication system 100 may determine a predicted throughput based on a network resource utilization (e.g., backhaul capacity, air-interface utilization and so on) associated with a predicted base station (e.g., base station 111) that wireless device 130 will utilize at the predicted location (130-3). Communication system 100 may determine a predicted throughput based on other predicted network resource utilizations associated with elements (e.g., ASN-GW, backhaul link, etc.) that are predicted to operatively couple wireless device 130 to content server 150. The predicted throughput may be a prediction of the maximum, minimum, average, and/or sustained throughput of the link between wireless device 130 and content server 150.

Based on the predicted throughput, a second throughput is determined (208). For example, communication system 100 may determine an adjusted throughput that content server 150 should use to send content to wireless device 130. For example, communication system 100 may increase or decrease the throughput that content server 150 is sending content to wireless device 130.

In an example, if the predicted throughput is less than a minimum required, and there is currently additional throughput capacity between content server 150 and wireless device 130, communication system 100 may instruct content server 150 to send content to wireless device 130 at a rate greater than a maximum throughput for the content. Wireless device 130 may then buffer the excess content sent by content server 150. This excess content may then be utilized by wireless device 130 when (and if) wireless device 130 is in the predicted location and the throughput between wireless device 130 and content server 150 is less than a minimum required. Thus, by utilizing buffered content, a service disruption at the predicted location may be avoided.

In an example, if the predicted throughput is less than a minimum required, communication system 100 may instruct content server 150 to send content to wireless device 130 at a lower rate. This lower rate may be at or below the predicted throughput rate. In this manner, the resources of network 120, base stations 110-111, wireless link 142, or content server 150 may be preserved since the minimum required throughput would not reach wireless device 130 at the predicted location.

Using the second throughput, the wireless device is communicated with (210). For example, communication system 100 may instruct content server 150 to send content to wireless device 130 at an adjusted rate.

Figure 3:
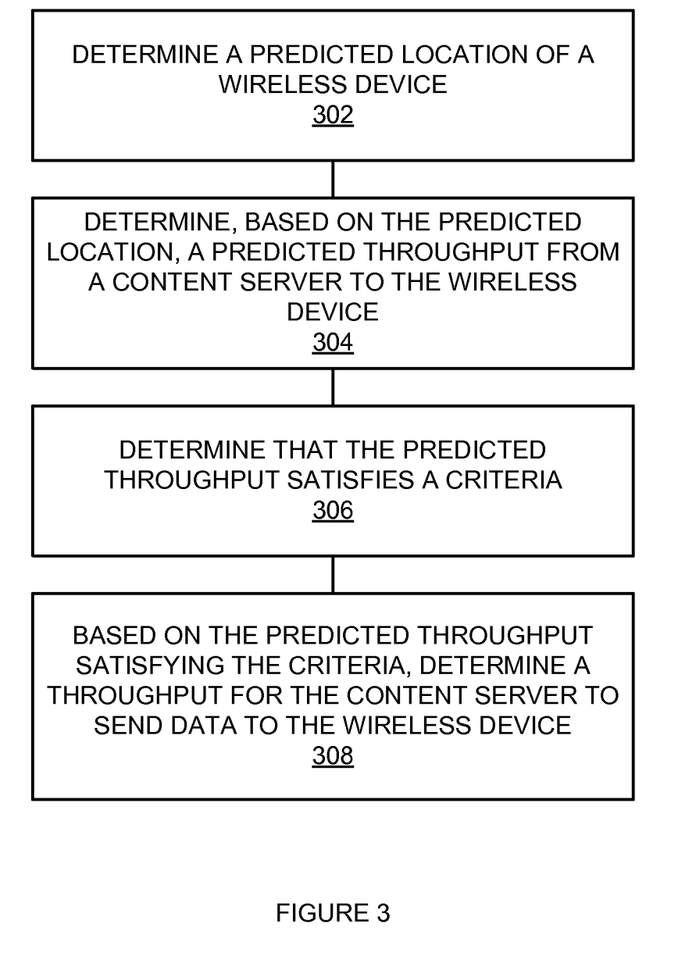
FIG. 3 is a flowchart illustrating a method of operating a communication system.

FIG. 3 is a flowchart illustrating a method of operating a communication system. The steps illustrated in FIG. 3 may be performed by one or more elements of communication system 100.

A predicted location of a wireless device is determined (302). For example, communication system 100 may determine a predicted location (130-3) for wireless device 130. This predicted location (130-3) may be determined in a manner describe previously.

Based on the predicted location, a predicted throughput from a content server to the wireless device is determined (304). For example, based on a predicted location (130-3), communication system 100 may determine a predicted throughput from content server 150 to wireless device 130. The predicted throughput may be a prediction of the maximum, minimum, average, and/or sustained throughput of the link between wireless device 130 and content server 150. The predicted throughput may be based on a variety of factors, such as a predicted air-interface and/or network path, described previously.

The predicted throughput is determined to satisfy a criteria (306). For example, communication system 100 may determine that the predicted throughput is less than a minimum required throughput for the type of content being sent by content server 150 to wireless device 130. In another example, communication system 100 may determine that the predicted throughput is more than a maximum throughput for the type of content being sent by content server 150 to wireless device 130.

Based on the predicted throughput satisfying the criteria, a throughput for the content server to send data to the wireless device is determined (308). For example, based on a predicted throughput being above or below a threshold (or thresholds), communication system 100 may determine a throughput for content server 150 to use to send content to wireless device 130.

For example, if (1) the predicted throughput is less than a threshold amount required for the content being sent from content server 150 to wireless device 130, and (2) there is currently additional throughput capacity between content server 150 and wireless device 130 that exceeds a threshold maximum amount, communication system 100 may instruct content server 150 to send content to wireless device 130 at a rate greater than a maximum threshold amount. Wireless device 130 may then buffer the excess content sent by content server 150. This excess content may be utilized by wireless device 130 when (and if) wireless device 130 is in the predicted location and the throughput between wireless device 130 and content server 150 is less than the minimum threshold amount. Thus, by utilizing buffered content, a service disruption at the predicted location may be avoided.

In another example, if the predicted throughput is less than a threshold minimum amount, communication system 100 may instruct content server 150 to send content to wireless device 130 at a lower rate. This lower rate may be at, or below, the predicted throughput rate, or the threshold minimum amount. In this manner, the resources of network 120, base stations 110-111, or content server 150 may be preserved since only an amount of throughput that will actually reach wireless device 130 at the predicted location will be utilized.

Figure 4:
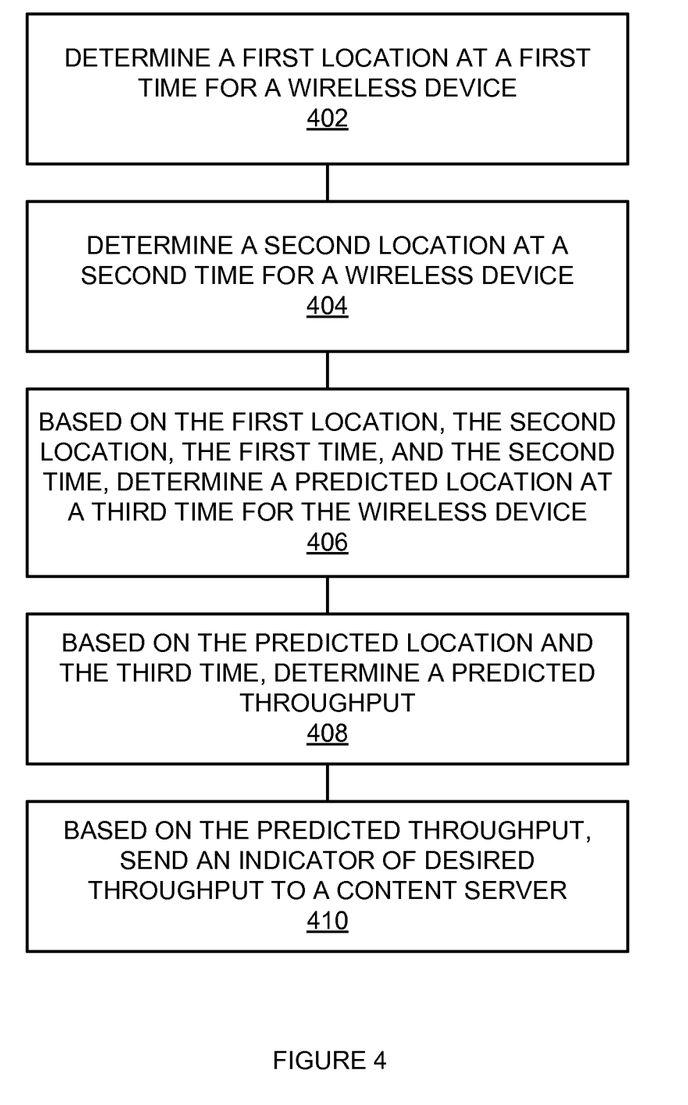
FIG. 4 is a flowchart illustrating a method of determining a desired throughput for a content server.

FIG. 4 is a flowchart illustrating a method of determining a desired throughput for a content server. The steps illustrated in FIG. 4 may be performed by one or more elements of communication system 100.

A first location at a first time is determined for a wireless device (402). For example, communication system 100 may determine a first location (130-1) at a first time for wireless device 130. A second location at a second time is determined for a wireless device (404). For example, communication system 100 may determine a second location (130-2) at a second time for wireless device 130. The first and second locations may be estimated in the manners described previously.

Based on the first location, the second location, the first time, and the second time, a predicted location at a third time is determined for the wireless device (406). For example, communication system 100 may, based on the first location (130-1), the second location (130-2), the first time, and the second time, determine a predicted location (130-3) for wireless device 130. The predicted location may be determined in a manner described previously.

Based on the predicted location and the third time, a predicted throughput is determined (408). For example, based on the RF conditions and network conditions associated with predicted location (130-3), communication system 100 may determine a predicted throughput for content being sent from content server 150 to wireless device 130.

Based on the predicted throughput, an indicator of desired throughput is sent to a content server (410). For example, based on the predicted throughput at predicted location (130-

3), communication system 100 may send an indicator of desired throughput to content server 150. This indicator of desired throughput may be selected based on whether the predicted throughput satisfies one or more criteria. For example, if the predicted throughput is less than a minimum amount required for the content being sent from content server 150 to wireless device 130, communication system 100 may instruct content server 150 to send content at around the predicted throughput rate. In another example, if the predicted throughput is more than a maximum typically required for the content being sent from content server 150 to wireless device 130, communication system 100 may instruct content server 150 to send content at some rate around the predicted throughput rate so that wireless device 130 may buffer the content.

The methods, systems, servers, networks, devices and base stations described above may be implemented with, contain, or be executed by one or more computer systems. The methods described above may also be stored on a computer readable medium. Many of the elements of communication network 100 may be, comprise, or include computers systems. This includes, but is not limited to communication system 100, base station 110, base station 111, wireless device 130, network 120, and content server 150.

Figure 5:
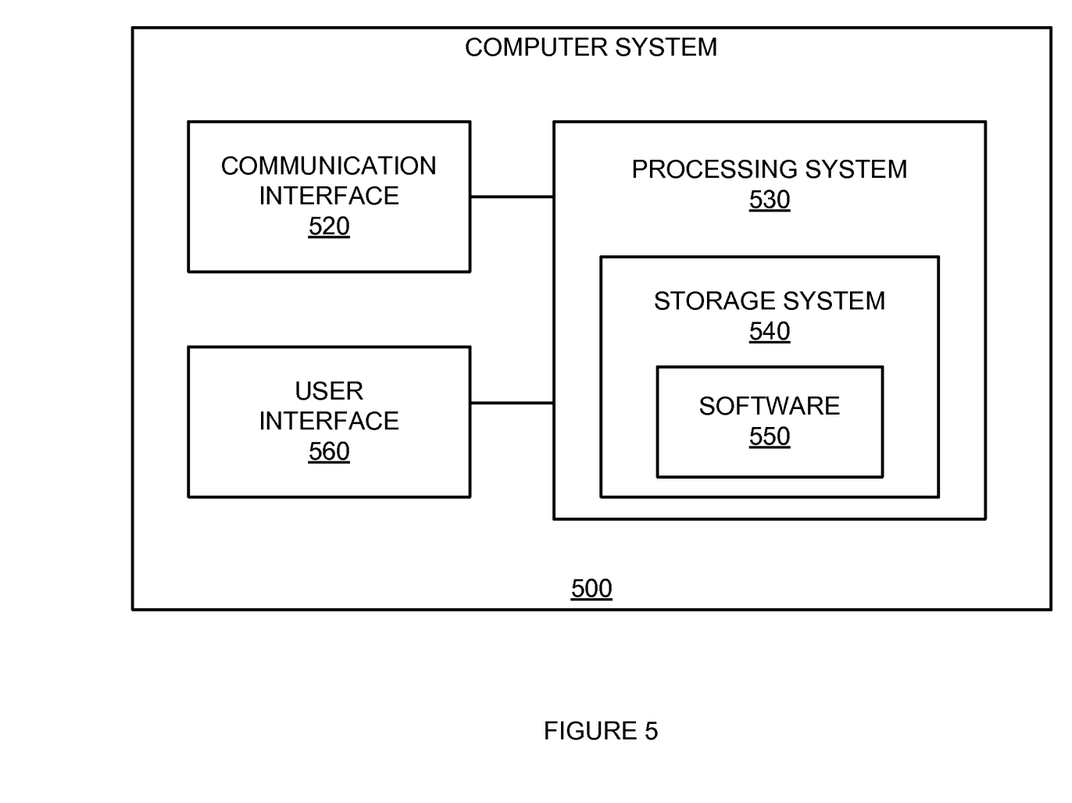
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   communicating content, using a first throughput, with a wireless device;
   determining a predicted location for the wireless device;
   determining a predicted throughput at the predicted location, wherein the predicted throughput is determined based on the predicted location, a predicted backhaul throughput, a predicted access services network gateway throughput, a predicted carrier to interference and noise ratio (CINR) that the wireless device will be using at the predicted location, and a predicted modulation and coding scheme (MCS) that the wireless device will be using at the predicted location;
   based on the predicted throughput, increasing or decreasing the first throughput to a second throughput at which the content is communicated before the wireless device reaches the predicted location; and
   communicating the content, using the second throughput, with the wireless device, wherein when the predicted throughput is greater than a maximum throughput required at the predicted location, the second throughput is greater than the maximum throughput.

2. The method of claim 1, wherein, when the predicted throughput is less than a minimum throughput required at the predicted location, the second throughput is no greater than the minimum throughput.

3. The method of claim 1, wherein the predicted throughput is based on a predicted signal quality indicator associated with the predicted location.

4. The method of claim 3, wherein the predicted location is associated with a base station and the predicted network resource availability is based on an air-interface resource availability associated with the base station.

5. The method of claim 3, wherein the predicted location is associated with a network and the predicted network resource availability is based on network resource availability associated with the network.

6. The method of claim 1, wherein the predicted throughput is based on a predicted network resource availability associated with the predicted location.

7. A method of operating a communication system, comprising:
   determining a predicted location of a wireless device;
   determining a predicted throughput from a content server to the wireless device, wherein the predicted throughput is determined based on the predicted location, a predicted backhaul throughput, a predicted access services network gateway throughput, a predicted carrier to interference and noise ratio (CINR) that the wireless device will be using at the predicted location, and a predicted modulation and coding scheme (MCS) that the wireless device will be using at the predicted location;
   determining that the predicted throughput is one of above a maximum threshold or below a minimum threshold;
   based on the predicted throughput being one of above the maximum threshold or below the minimum threshold, determining a desired throughput for the content server to send data to the wireless device before the wireless device reaches the predicted location; and
   sending data to the wireless device from the content server at the desired throughput, wherein when the predicted throughput is greater than a maximum throughput required at the predicted location, the desired throughput is greater than the maximum throughput.

8. The method of claim 7, wherein the minimum threshold is a minimum bitrate associated with content that content server is providing to the wireless device.

9. The method of claim 7, wherein the maximum threshold is a maximum bitrate associated with content that content server is providing to the wireless device.

10. The method of claim 7, wherein the predicted throughput is based on a predicted signal quality indicator associated with the predicted location.

11. The method of claim 10, wherein the predicted location is associated with a base station and the predicted throughput is based on an air-interface resource availability associated with the base station.

12. The method of claim 10, wherein the predicted location is associated with a network and the predicted throughput is based on network resource availability associated with the network.

13. A method of operating a communication system, comprising:
    determining a first location at a first time for a wireless device;
    determining a second location at a second time for the wireless device;
    based on the first location, the second location, the first time, and the second time, determining a predicted location at a third time for the wireless device;
    determining a predicted throughput at a computer system of the communication system, wherein the computer system comprises a processing system and wherein the computer system determines the predicted throughput based on the predicted location at the third time, a predicted backhaul throughput, a predicted access services network gateway throughput, a predicted carrier to interference and noise ratio (CINR) that the wireless device will be using at the predicted location, and a predicted modulation and coding scheme (MCS) that the wireless device will be using at the predicted location; and,
    based on the predicted throughput, sending an indicator of desired throughput before the wireless device reaches the predicted location from the computer system to a content server, wherein when the predicted throughput is greater than a maximum throughput required at the predicted location, the desired throughput is greater than the maximum throughput.

14. The method of claim 13, wherein based on the predicted throughput being less than a minimum bitrate associated with content that the content server is providing, the desired throughput is less than a current throughput to the wireless device.

15. The method of claim 13, wherein based on the predicted throughput exceeding a maximum bitrate associated with content that the content server is providing, the desired throughput is more than a current throughput to the wireless device.

16. The method of claim 13, wherein the predicted location would result in a different network device providing network resources to the wireless device than the second location.

17. The method of claim 13, wherein the predicted location is associated with a base station and the predicted throughput is based on an air-interface resource availability associated with the base station.

* * * * *